(12) United States Patent
Mootz et al.

(10) Patent No.: US 7,090,416 B2
(45) Date of Patent: Aug. 15, 2006

(54) SELF LEVELING CAMERA SUPPORT APPARATUS

(76) Inventors: Jeffery Scott Mootz, 303 Valley Green Sq., Lesueur, MN (US) 56058; Denis Daryl Shoemaker, 31194 490th St., Kasota, MN (US) 56050

( * ) Notice: Subject to any disclaimer, the term of this patent is extended or adjusted under 35 U.S.C. 154(b) by 0 days.

(21) Appl. No.: 10/708,438

(22) Filed: Mar. 3, 2004

(65) Prior Publication Data
US 2005/0196162 A1 Sep. 8, 2005

(51) Int. Cl.
G03B 17/00 (2006.01)
H04N 5/225 (2006.01)
F16M 11/04 (2006.01)

(52) U.S. Cl. .................. 396/421; 396/428; 348/373; 248/187.1

(58) Field of Classification Search .......... 248/180.1, 248/187.1; 396/12, 13, 419, 421, 428; 348/208.7, 348/208.99, 373, 375; 352/243
See application file for complete search history.

(56) References Cited

U.S. PATENT DOCUMENTS

| | | | | |
|---|---|---|---|---|
| 3,467,350 A | * | 9/1969 | Tyler | 248/636 |
| 3,632,076 A | | 1/1972 | Rogers, Jr. | 248/371 |
| 4,158,490 A | * | 6/1979 | Gottschalk et al. | 352/243 |
| 4,247,069 A | | 1/1981 | Kurz | 248/185 |
| 4,338,875 A | * | 7/1982 | Lisowski | 114/221 R |
| 4,621,785 A | * | 11/1986 | Embra | 248/565 |
| 4,645,320 A | | 2/1987 | Muelling et al. | 354/81 |
| 4,752,791 A | * | 6/1988 | Allred | 396/419 |
| 5,190,256 A | * | 3/1993 | Macchiarella | 248/177.1 |
| 5,243,370 A | | 9/1993 | Slater | 352/243 |
| 5,742,859 A | * | 4/1998 | Acker | 396/428 |
| 5,897,223 A | | 4/1999 | Tritchew et al. | 396/13 |
| 5,940,644 A | | 8/1999 | Putora | 396/421 |
| 5,963,749 A | | 10/1999 | Nicholson | 396/421 |
| 6,293,449 B1 | * | 9/2001 | McGuire et al. | 224/420 |
| 2003/0007795 A1 | | 1/2003 | Grober | 396/55 |

OTHER PUBLICATIONS

Melton International Tackle, Custom Camera Mount, meltontackle website.
Trakker tm , Video Camera Mount, Overtons catalog p. 23 and tgoemall website.
Birdsallmarine, Video Mount, birdsallmarine website.

* cited by examiner

Primary Examiner—W. B. Perkey
Assistant Examiner—Rishi Suthar
(74) Attorney, Agent, or Firm—Roger A. Jackson

(57) ABSTRACT

A self leveling camera support apparatus and method for helping isolate a camera from rolling motion of a support structure. The apparatus includes a frame having a first end adapted to attach to the support structure and a second end with a pivotal connection. Also included, is a roll member adapted to attach the camera, the roll member is pivotally attached to the pivotal connection, the roll member also includes an extension arm with a proximal end portion and a distal end portion adjacent to a counter balance weight. The roll member is operational to help the camera level from roll movement of the frame, resulting from a center of mass of the roll member, camera, extension arm, and counterbalance weight combined, the center of mass positioned between the pivotal connection and the frame first end, wherein the frame and the extension arm form a parallel to angular relationship.

16 Claims, 4 Drawing Sheets

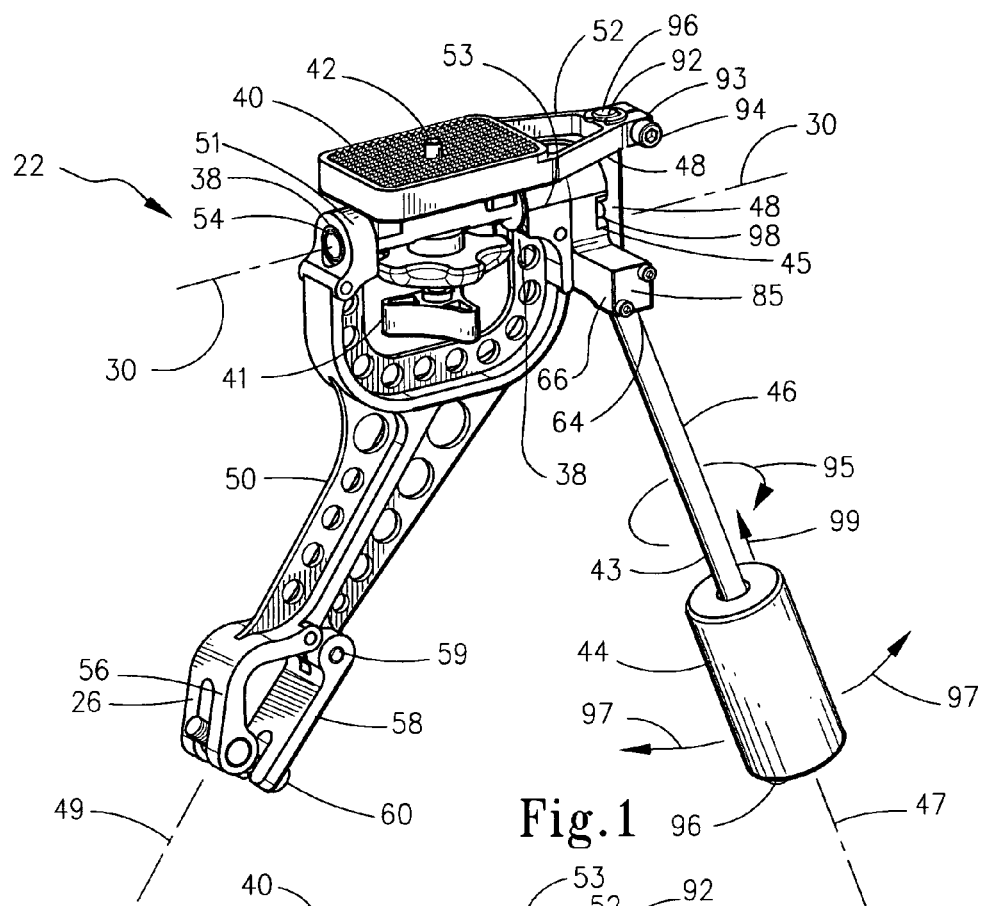

SELF LEVELING CAMERA SUPPORT APPARATUS

TECHNICAL FIELD

This invention relates generally to camera movement stabilizing devices and apparatus and more particularly to support mounting apparatus for helping to stabilize a camera mounted on a marine vessel from rolling movement, with rolling movement being defined as along an axis that is parallel to the camera's lens line of sight axis.

BACKGROUND OF INVENTION

There exists a need to minimize unwanted camera motion, which tends to occur when the structure that the camera is mounted to has motion that is inherent in the particular location or application that the desired camera shot is wanted, such as in the case of mounting a camera to a marine vessel that at the very least has rolling motion from waves, wind, and the like. This problem is well recognized in the prior art with a number of complex to simple solutions in existence. The solutions exist either within the camera itself and/or are in the camera support or mounting apparatus. The typical complex solution to the aforementioned problem is with the use of either a gyroscopic mount or the use of a gimbal bearing(s) that allows multi axis movement that is typically termed; roll, pitch, and yaw of a portion of the camera mount that is affixed to for instance, the marine vessel while helping to stabilize the other portion of the camera mount so that the camera keeps a true orientation to the horizon or a selected position with minimal unwanted movement. There are additional enhancements to either the gyroscopic mount or to the gimbal bearing for computer control to help maintain a desired orientation of the camera. Simpler prior art solutions would involve a pendulum mount type of arrangement having single axis or multiple axis capabilities with a counterweight to help maintain the camera orientation to the horizon with movement of the non pendulum portion of the camera mount.

An example of a complex prior art solution would be in U.S. Pat. No. 5,897,223 to Tritchew et al. that is a stabilizing platform system for a camera that helps isolate the camera from multiple axis motion being about the roll, pitch, and yaw axes including a passive vibration isolator, this is accomplished by the use of multiple gimbal bearings and dampened coil springs, or optionally multiple magnetic torque motors for controlling positioning force against the gimbal bearing(s). Tritchew et al. would be considered a high end type of camera stabilizing apparatus by having control over multiple axes of undesired camera movement, a vibration isolator, and the ability to control camera movement. A further example of a complex part solution would be in U.S. Patent Application Publication No. US 2003/0007795 A1 to Grober that is a stabilizing camera mount specifically designed to mount upon a buoy that is acted upon by a wave motion when the camera mount attempts to stabilize the camera's view in multiple axes and having remote control for relative camera positioning. Grober utilizes either an electronically stabilized device or a gimbal bearing.

An example of a simple prior art solution would be in U.S. Pat. No. 5,243,370 to Slater that is a camera stabilizer using counterweights on an extension beam that utilizes the inertia of the weights to stabilize the camera's position, with each weight covering one single axis of motion that is typically undampened and would have no relative position control of the camera on the part of the camera operator. Slater, while appealing for its simplicity unfortunately has drawbacks in that the counterweights add weight to the stabilizer while the extension arms add bulk to the stabilizer, making the stabilizer unwieldy to handle. A further example of a simple prior art solution would be in U.S. Pat. No. 5,742,859 to Acker that discloses a camera support and stabilizing device by again using counterweights on extension arms to allow for a stable positioning of the camera relative to movement of the base support. Acker has some further refinements in being able to adjust the extension arm and counterweight location relative to the camera.

An example of an intermediate complexity prior art solution would be in U.S. Pat. No. 4,645,320 to Muelling et al. that is a camera mount for a motor vehicle that utilizes a pendulum on a stand with a gimbal bearing between the pendulum and the stand with the camera mounted on the pendulum and the interaction between the pendulum and the stand controlled by springs and dampening elements, with the springs controlling the relative position of the camera to the motor vehicle position.

There exists a need for a camera support apparatus by providing at least an automatically leveling assistance on a camera roll axis with a degree of dampening control on the cameras corrective movement that is not especially complex, large, heavy, or expensive for a camera operator to use.

SUMMARY OF INVENTION

The present invention of a self leveling camera support apparatus for helping isolate a camera from a rolling axis motion of a support structure broadly includes, a frame having a longitudinal axis, the frame including a first end that is adapted to attach to a support structure and a second end that forms a pivotal connection having a pivotal roll axis. Also included, is a roll member adapted to attach to the camera, the roll member is pivotally attached to the pivotal connection by a pivotal shaft, being operational to pivot parallel to the pivotal roll axis. The roll member also includes an extension arm having a longitudinal axis, the extension arm including a proximal end portion that is adjacent to the roll member, the extension arm longitudinal axis being positioned approximately perpendicular to the pivotal roll axis. The extension arm also including a distal end portion that is adjacent to a counter balance weight, the roll member is operational to help maintain the camera positional orientation level in relation to arbitrary pivotal roll movement of the frame, resulting from a selectively positioned center of mass of the roll member, camera, extension arm, and counterbalance weight combined. The center of mass being positioned between the pivotal roll axis and the frame first end, wherein the frame longitudinal axis and the extension arm longitudinal axis form a parallel to angular relationship.

These and other objects of the present invention will become more readily appreciated and understood from a consideration of the following detailed description of the exemplary embodiment(s) of the present invention when taken together with the accompanying drawings, in which;

BRIEF DESCRIPTION OF DRAWINGS

FIG. 1 shows a perspective view of the self leveling camera support apparatus assembly;

FIG. 2 shows a side view of the self leveling camera support apparatus assembly;

REFERENCE NUMBER IN DRAWINGS

Figure 3:
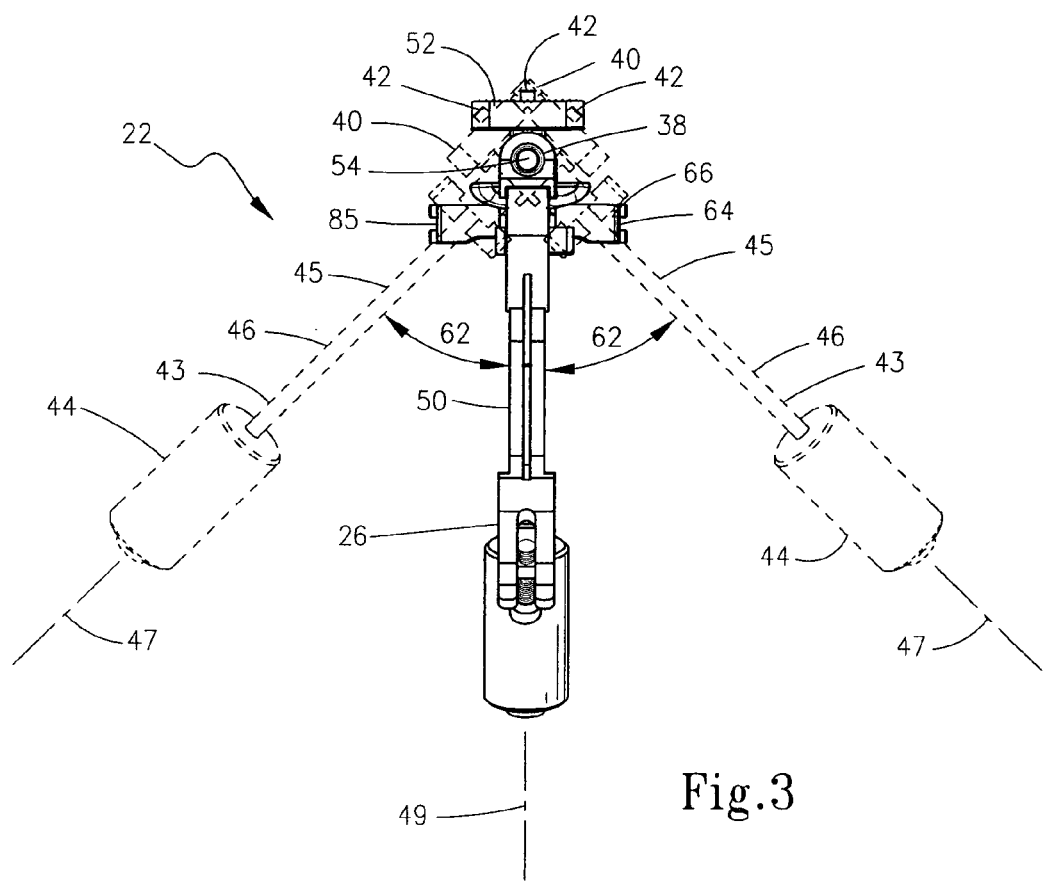
FIG. 3 shows an end view of the self leveling camera support apparatus assembly indicating the roll range of motion or of leveling movement.

22 Self leveling camera support apparatus assembly
24 Camera
25 Marine vessel
26 Frame first end
28 Support structure in the form of a marine vessel railing
29 Marine vessel rail outside circumference
30 Pivotal roll axis
31 Rolling axis motion of support structure or frame arbitrary pivotal roll movement
32 Horizon, either water horizon, or land horizon, or land shoreline
34 Water surface
36 Shoreline
38 Roll axis bearings
40 Camera mount pad
41 Camera mount securing device
42 Camera mount screw
43 Extension arm distal end portion
44 Counter balance weight
45 Extension arm proximal end portion
46 Extension arm
47 Extension arm longitudinal axis
48 Extension arm proximal end portion fixably adjustable element
49 Frame longitudinal axis
50 Frame
51 Frame second end pivotal connection on non dampener side
52 Roll member
53 Frame second end pivotal connection on dampener side
54 Roll member pivotal shaft
56 Marine vessel rail clamp arcuate section
58 Marine vessel rail clamp pivotal element
59 Marine vessel rail clamp pivotal element pivot
60 Marine vessel rail clamp fastener
61 Roll angle between frame longitudinal axis and extension arm longitudinal axis
62 Roll range of motion
63 Support structure angle in relation to horizon
64 Dampener assembly
66 Dampener housing
67 Dampener gear housing
68 Pivotal shaft drive gear
69 Pivotal shaft drive gear movement
70 Dampener idler gear
71 Dampener idler gear movement
72 Dampener idler gear shaft
74 Dampener piston gear rack
75 Dampener piston rack movement
76 Dampener piston
77 Dampener piston ends oring
78 Dampener internal cylinder
80 Dampener fluid
82 Dampener fluid passage
84 Dampener fluid flow restriction orifice
85 Dampener housing end caps
86 Dampener housing ends dampening fluid communication passage
87 Dampener variable size orifice insert
88 Dampener housing ends oring
89 Dampener housing end cap fasteners
90 Selected center of mass position of roll member, camera, extension arm, counterbalance weight all combined
92 Roll member aperture
93 Roll member aperture split line
94 Roll member lockable element
95 Extension arm selected rotational position
96 Axial retention element
97 Counterbalance weight position
98 Extension arm proximal end portion fixed angle portion
99 Counterbalance weight movement along extension arm distal end portion

DETAILED DESCRIPTION

Figure 4:
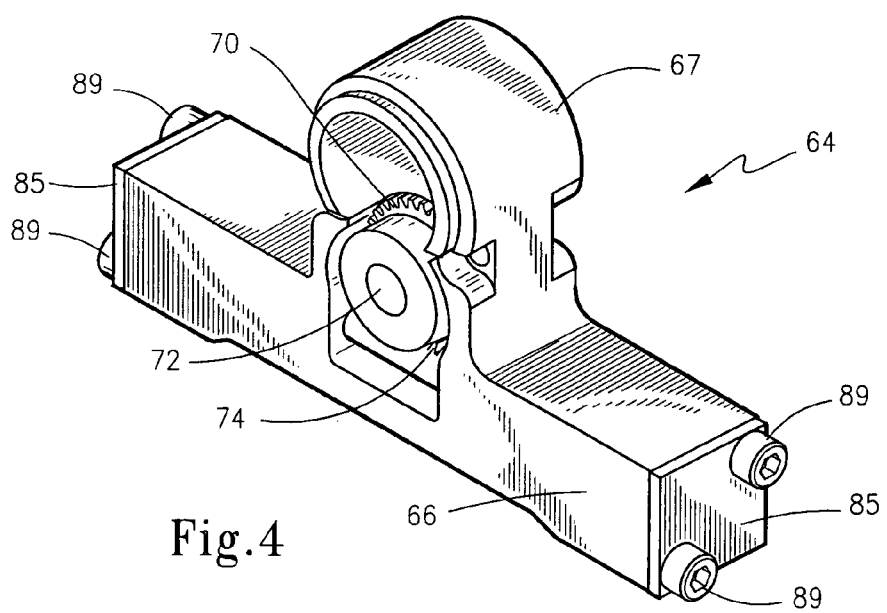
FIG. 4 shows a perspective view of the dampener assembly.
Figure 5:
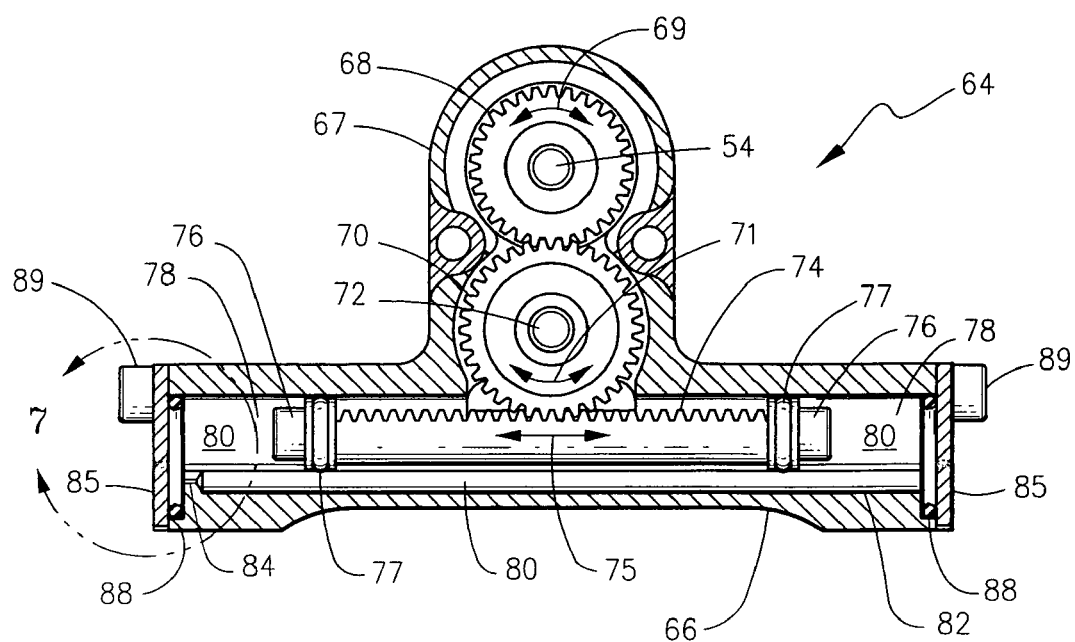
FIG. 5 shows cross sectional view 5—5 from FIG. 6 of the dampener assembly.
Figure 6:
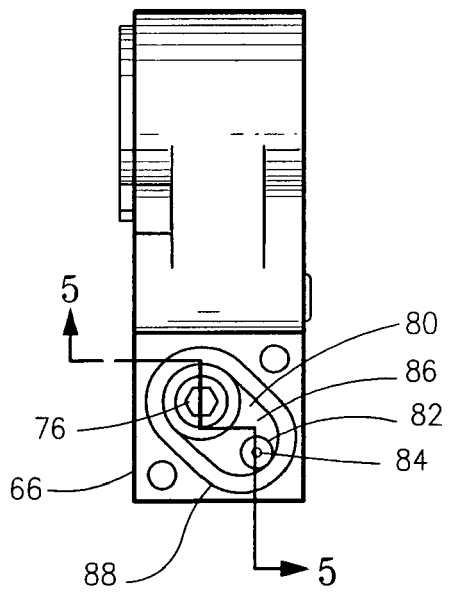
FIG. 6 shows an end view of the dampener assembly with the dampener housing end cap removed.
Figure 7:
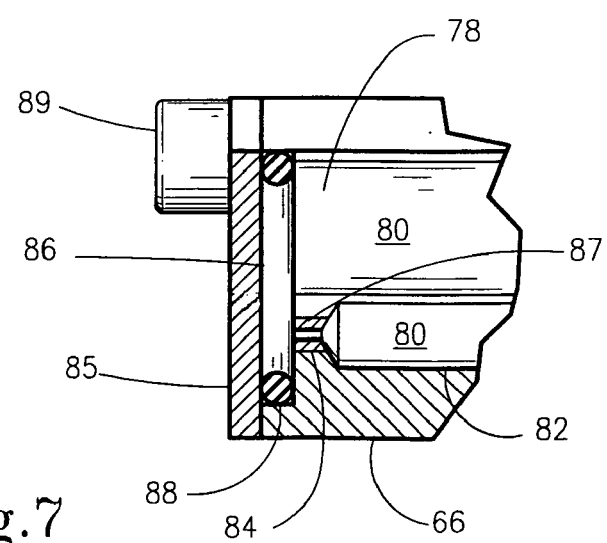
FIG. 7 shows an expanded view of section 7 in FIG. 5 of the dampener housing orifice end with the dampener fluid flow restriction orifice.
Figure 8:
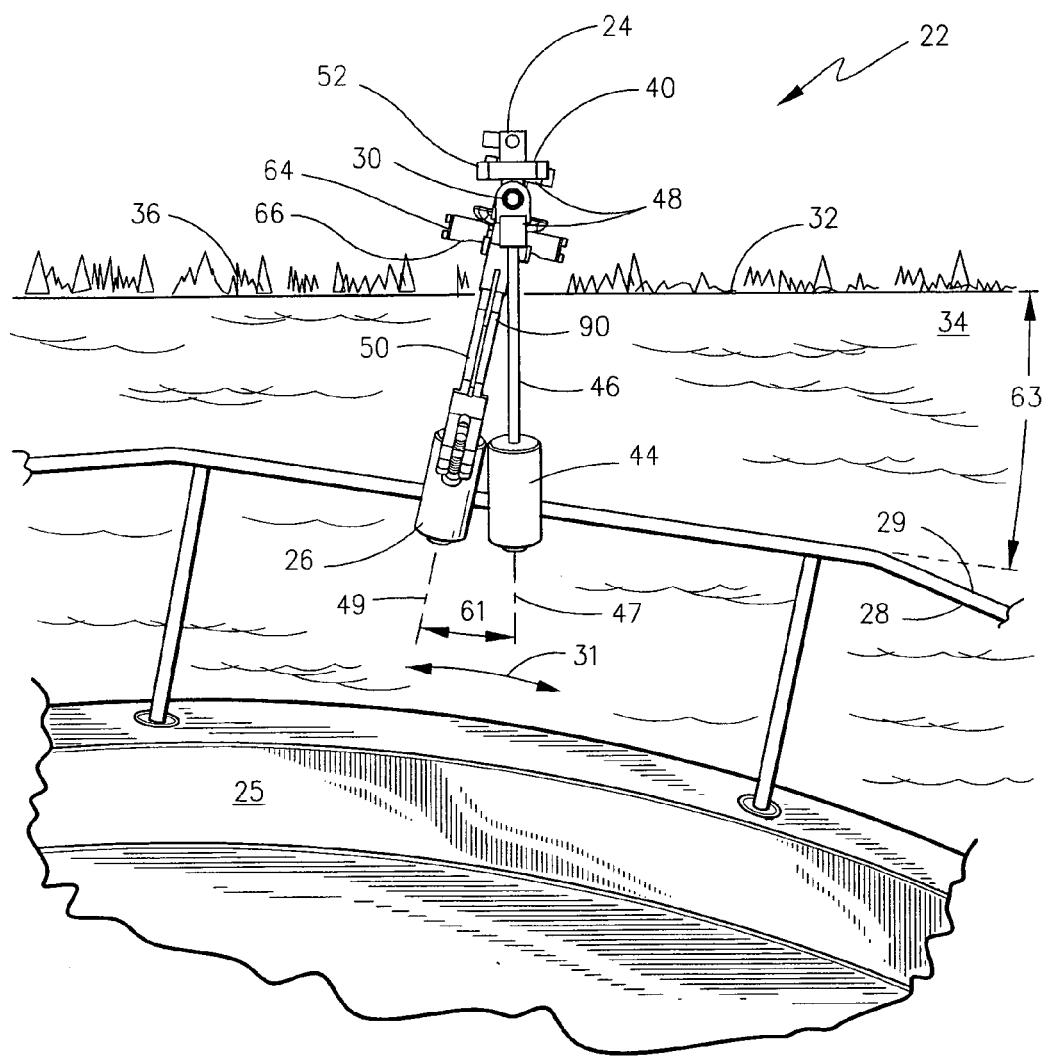
FIG. 8 shows a perspective use view of the self leveling camera support apparatus assembly mounted on a marine vessel railing angled in relation to the horizon.

With reference to FIGS. 1 through 8, wherein FIG. 1 shows a perspective view of the self leveling camera support apparatus assembly 22, and FIG. 2 shows a side view of the self leveling camera support apparatus assembly 22. FIG. 3 shows an end view of the self leveling camera support apparatus assembly 22 indicating the roll range of motion or of leveling movement 62 of the roll member 52 in relation to a frame 50 as indicated by a extension arm longitudinal axis 47 in relation to a frame longitudinal axis 49 respectively, which is preferably plus or minus forty five (45) degrees for a total range of movement of about ninety (90) degrees, however, this roll range of movement 62 could be more or less depending upon the specifics of a particular application. Further, FIG. 4 shows a perspective view of the dampener assembly 64, FIG. 5 shows cross sectional view 5—5 from FIG. 6 of the dampener assembly 64, FIG. 6 shows an end view of the dampener assembly 64 with the dampener housing end cap 85 removed, FIG. 7 shows an expanded view of section 7 in FIG. 5 of the dampener housing 66 orifice 84 end with the dampener fluid flow restriction orifice 84, and FIG. 8 shows a perspective use view of the self leveling camera support apparatus assembly 22 mounted on a marine vessel 25 railing 28 angled 63 in relation to the horizon 32.

Broadly, the present invention of a self leveling camera support apparatus 22 for helping isolate a camera 24 from a rolling axis motion 31 of a support structure 28 includes a frame 50 having a longitudinal axis 49, the frame includes a first end 26 that is adapted to attach to a support structure 28 and a frame second end that includes a frame second end pivotal connection on the non dampener 64 side 51 and a frame second end pivotal connection on the dampener 64 side 53 that together form the pivotal connections 51 and 53 having a pivotal roll axis 30. The materials of construction for the frame 50 are preferably aluminum, alternatively stainless steel, plastics, or composites could be used that are suitable for a marine application. Also included is a roll member 52 that is adapted to attach to the camera 24, using a standard one quarter (¼) inch screw 42 fastener on a camera 24 mount pad 40, however, other mounting configurations could be used depending upon the specific camera 24 that would be adequate to secure the camera 24 to the roll member 52. The roll member 52 is pivotally attached to the pivotal connections 51 and 53 by a pivotal shaft 54, with the roll member 52 being operational to pivot about the pivotal roll axis 30. Preferably, the interface between the pivotal connections 51 and 53 and the pivotal shaft 54 is accomplished by use of sleeve bearings 38 manufactured by IGUS, part number TFI-0809-08. Alternatively, the bearings 38 could by any type of sliding contact between the pivotal connections 51 and 53 and the pivotal shaft 54 that would accomplish the aforementioned pivotal movement and be suitable for a marine environment. The roll member 52 also includes an extension arm 46 having a longitudinal axis 47, the extension arm 46 including a proximal end portion 45 that is adjacent to the roll member 52. The extension arm 46 longitudinal axis 47 being positioned approximately perpendicular to the pivotal roll axis 30, with the extension arm 46 also including a distal end portion 43 that is adjacent to a counter balance weight 44 that is also included with the extension arm 46. The roll member 52 is operational to help maintain the camera 24 positional orientation level, for example to the horizon 32 in relation to arbitrary pivotal roll movement 31 of the frame 50, wherein the frame 50 is adapted to be attached to the support structure 28, with the support structure 28 and the frame 50 moving in a substantially like manner from the arbitrary pivotal roll movement 31. Thus, the roll member 52 is operational to help maintain the camera 24 positional orientation level, for example to the horizon 32 in relation to arbitrary pivotal roll movement 31 of the frame 50 resulting from a selectively positioned center of mass 90 of the roll member 52, camera 24, extension arm 46, and counterbalance weight 44 combined, with the center of mass 90 being positioned between the pivotal roll axis 30 and the frame 50 first end 26, wherein the frame longitudinal axis 49 and the extension arm 46 longitudinal axis 47 form a parallel to angular relationship depending upon the arbitrary pivotal roll movement 31 of the frame 50, wherein the frame 50 is adapted to be attached to the support structure 28. The typical camera 24 weight that is anticipated for the self leveling camera support apparatus 22 is about 0.5 pounds to 3.0 pounds, with the possibility that the camera weight 24 being more or less than this range for a particular application.

Moving in particular to the optional dampener assembly 64 that is positioned adjacent to both the frame 50 and the roll member 52, as best shown in FIGS. 1–3, with the dampener 64 being operational to help control or dampen the relative arbitrary pivotal roll movement 31 of the frame 50 to the roll member 52. Preferably, the dampener 64 is a piston 76 and cylinder 78 type utilizing a restriction orifice 84 that is typically fixed in size by having a set internal diameter to control the flow of a fluid 80 from the piston 76 and cylinder 78 to control a movement of the piston 76 in relation to the cylinder 78, wherein the control of movement between the piston 76 in relation to the cylinder 78 results in the control of the relative arbitrary pivotal roll movement 31 of the frame 50 to the roll member 52, with the dampener 64 detail best shown in FIGS. 5–7. The dampener 64 performance is typically measured in; (force multiplied by time) divided by distance, or in English units (pound-seconds) per foot, which is adding movement resistance between the relative arbitrary pivotal roll movement 31 of the frame 50 to the roll member 52 with the effect of smoothing out the leveling correction of the camera 24 and minimizing an over-shooting and/or pendulum effect of the leveling correction of the camera 24. The dampening resistance is a function of the weight of the camera 24 and the magnitude or roll angle 61 and the frequency of the roll angle 61 changing. The desired range of dampening resistance is about 0.25 (pound-seconds) per foot to 2.0 (pound-seconds) per foot for an anticipated range, however, the dampening resistance could be more or less than this range depending upon the particulars of the camera 24 and the magnitude or roll angle 61 and the frequency of the roll angle 61 changing. Additionally, an optional dampener 64 variable size restriction orifice 87, as best shown in FIG. 7, can be added that is operational to further control the movement of the piston 76 in relation to the cylinder 78. Note that the orifice 84 can initially be fixed in size for a particular application to set the aforementioned dampening resistance, or the fixed in size orifice 84 can be interchangeable, as best shown in FIG. 7, with a different size of fixed in size orifice 84 to change the dampening resistance to another selected or desired dampening resistance. The effect of changing the fixed in size orifice 84 to another size of fixed in size orifice 84 can result in the variable size restriction orifice 87 functional effect to control the dampening resistance, however, a single orifice that is variable or adjustable could be utilized for instance in the form of a valve that is operational to control the flowrate of the dampener fluid 80. The preferred range of diameter of fixed in size orifices 84 or the alternative range of orifice diameter size variance 87 is about 0.013 inches to 0.028 inches as an internal diameter, however, as orifice size is related to dampening resistance, the orifice 84 or variable orifice 87 could be more or less than this range depending upon the particulars of the camera 24 and the magnitude or roll angle 61 and the frequency of the roll angle 61 changing in use for the self leveling camera 24 support apparatus 22 assembly.

Further, on the detail of the optional dampener 64, referring specifically to FIGS. 4–7, the piston 76 diameter is preferably about 0.312 inches that has a slidable engagement with the cylinder 78, operating in conjunction with the piston 76 moving axially within the cylinder 78 having a preferable linear travel or dampener piston rack movement 75 of about 1.0625 inches. For fluid 80 sealing been the piston 76 and the cylinder 78 a dynamic o ring 77 is preferably used on each end of the piston 76 as best shown in FIG. 5, with the o ring 77 being about a size 0.070 inches cross section by 0.317 inches in diameter denoted as part number AS568A 008, constructed of Buna N (Nitrile) material. Looking in particular at the dampener housing end caps 85, the end cap 85 to dampener housing 66 dampener fluid 80 sealing o rings 88, the end cap 85 fasteners 89, the fluid 80 in the volume between the piston 76 and the end cap 85, the dampener housing end 85 fluid 80 communication passage 86, the dampener fluid passage 82, and the orifice 84 the following functional description is given; As the piston moves 75, fluid 80 between the piston 76 and the end cap 85 is displaced volumetrically either into or out of the fluid passage 82 by communicating from the volume between the piston 76 and the end cap 85 continuing through the communication passage 86, as best shown in FIGS. 6 and 7, and into the fluid passage 82, with the fluid being forced to flow through the orifice 84 anytime that there is movement 75 of the piston 76 in the cylinder 78, such that the dampening resistance as previously described is set by primarily by the orifice 84 size and to some extent the fluid 80 properties, such as viscosity, density, lubricity, and the like. Preferably o ring 88 is about a size 0.070 inches cross section by 0.562 inches in diameter denoted as part number AS568A 013 constructed of Buna N (Nitrile) material. The preferred materials of construction for the piston 76 are 303 stainless steel, the cylinder 78 and the dampener housing 66 are both 6061 aluminum, the fasteners 89 are 316 stainless steel, and the housing end caps 85 are 303 stainless steel. Although an embodiment of the dampener 64 has been described, other materials that are marine environment suitable, sizes, and seal types could be utilized depending upon the particular application involving camera 24 weight and the selectively positioned center of mass 90 along with the magnitude or roll angle 61 and the frequency of the roll angle 61 changing in use for the self leveling camera 24 support apparatus 22 assembly.

Continuing on the optional dampener 64, the driving of the dampener 64 by the roll member 52 or in other words the conversion of the relative arbitrary pivotal roll movement 31 of the frame 50 to the roll member 52 in converting to piston 76 movement within the cylinder 78 is preferably accomplished by the roll member pivotal shaft 54 that is rotatably attached to a pivotal shaft drive gear 68, with the pivotal shaft drive gear 68 being rotationally engaged to an idler gear 70 that is rotationally mounted on an idler shaft 72, with the idler gear 70 being rotation-engaged to a gear rack 74 on the piston 76, as best shown in FIGS. 4 and 5. Thus, operationally the relative arbitrary pivotal roll movement 31 of the frame 50 to the roll member 52 is transmitted into the piston 76 movement 75 in relation to the cylinder 78 by the pivotal shaft 54 and drive gear 68, the idler gear 70, and the gear rack 74 on the piston 76 by creating a selectable relation of movement between the roll member 52 and the piston 76. The rotational movement of the pivotal shaft drive gear 68 is indicated by rotation 69 movement, with the idler gear 70 rotational movement indicated by rotation 71 movement that operates in conjunction with movement 75 on the dampener piston rack 74. The pivotal shaft drive gear 68 and the idler gear 70 are contained within housing 67 that is adjacent to the dampener housing 66, as best shown in FIGS. 4, 5, and 6, with housing 67 also adjacent to the roll member 52 and frame 50, as best shown in FIGS. 1 and 2. The preferred materials of construction for the housing 67 is 6061 aluminum, with the preferred materials of construction for the pivotal shaft drive gear 68 being 303 stainless steel and idler gear 70 being Acetal. Also, the preferred gear size for both the pivotal shaft drive gear 68 and idler gear 70 is a 48 diameteral pitch, with the preferred number of teeth on the gear 68 being 30, with a preferred gear face width of 0.125 inches and correspondingly on the idler gear 70 with the preferred number of teeth on the idler gear 70 being 34, with a preferred gear face width of 0.125 inches. Again, although an embodiment of the dampener 64 drive by the roll member 52 has been described, other materials that are marine environment suitable and gear sizes to change the relative movement between the roll member 52 and the piston 76 could be utilized to further change the dampening resistance depending upon the particular application involving camera 24 weight and selectively positioned center of mass 90 along with the magnitude or roll angle 61 and the frequency of the roll angle 61 changing in use for the self leveling camera 24 support apparatus 22 assembly. The dampener fluid 80 is preferably manufactured by Citgo Petroleum being type or model number JT-7 (SAE 85W 140), other types of dampener fluid 80 could be utilized with differing properties of viscosity, density, lubricity, and the like to adjust the dampening resistance.

Returning to the frame 50, particularly FIGS. 1, 2, and 8, looking more specifically at the frame 50 first end 26 that is adapted to attach to the support structure 28 further includes an arcuate section 56 configured to substantially conform to a portion of a marine vessel rail 28 outside circumference 29, a rail clamp pivotal element 58 that is pivotally attached 59 to the frame first end 26, and a rail clamp fastener 60, wherein the aforementioned frame first end 26 added elements are operational to removably attach the frame 50 to a marine vessel rail 28 by clamping upon the marine vessel rail 28 outside circumference 29. The typical size or outside diameter of the marine vessel rail 28 is from about seven eighths (⅞) of an inch to one inch and one eighths (1⅛) of an inch, however, larger or smaller marine vessel railing 28 diameters could be accommodated by the frame 50 first end 26 if required. Also, the support structure 28 could be something other than a marine vessel railing 28 also if required wherein the frame 50 first end 26 could be adapted to attach to another type of support structure.

Next, returning in detail to the extension arm 46 proximal end portion 45, as best shown in FIGS. 1–3, and 8 that is adjacent to the roll member 52 further comprises a fixably adjustable element 48 that allows the extension arm 46 including the extension arm 46 longitudinal axis 47 to selectively deviate from being approximately perpendicular to the pivotal roll axis 30, wherein the fixably adjustable element 48 is operational to accommodate a camera 24 with an offset center of gravity by altering the position of the center of mass 90 as previously described. The camera 24 having an offset center of gravity being defined as the camera 24 center of gravity not being in line with a central portion of the camera 24 mount 40 or more specifically the camera 24 mount screw 42, in other words the camera 24 center of gravity not being symmetric to its mount or positioned offset from the pivotal roll axis 30 requiring that the center of mass 90 be altered by moving the lateral position of the counter balance weight 44 to an offset position in relation to the pivotal roll axis 30 opposite that of the center of gravity offset of the camera 24 in relation to the pivotal roll axis 30. More particularly, the fixably adjustable element 48 further includes an aperture 92, as best shown in FIGS. 1 and 2, with the aperture 92 being in the roll member 52 that rotationally receives and axially retains through the use of a axial retention element 96 being preferably a circular spring clip 96 with an open end that is received in an annular groove in the extension arm 46 proximal end portion 45 as is well known in the art. The extension arm 46 proximal end portion 45 is rotationally received and axially retained in the roll member 52 allowing a selected rotational 95 position of the extension arm 46 to be locked in place with a roll member lockable element 94, with the lockable element 94 comprising preferably a fastener that clamps across a split line 93 to pinch the aperture 92 upon the extension arm 46 proximal end portion 45. This results in the counterbalance weight 44 repositioning via movement 97 with the extension arm 46 proximal end portion 45 including a fixed angle portion 98, wherein the fixed angle portion 98 could also be a selectable angle thus to deviate by way of the extension arm 46 longitudinal axis 47 more or less from being perpendicular to the pivotal roll axis 30 as best shown in FIG. 2. The preferred materials of construction for the extension arm and associated elements such as the axial retention element 96 and roll member lockable element 94 are 303 stainless steel or other alternatives that are suitable for a marine environment.

Further, returning in detail to the counterbalance weight 44 that is adjacent to the extension arm 46 distal end portion 43 that is removably engagable from the extension arm 46 distal end portion 43, thus being operational to selectively change the amount of counterbalance weight 44, to alter or maintain a selected position of the center of mass 90, thus accommodating different weight cameras 24. More particularly, the counterbalance weight 44 removable engagement from the extension arm 46 distal end portion 43 is preferably accomplished by the use of an axial retainer through the use of a axial retention element 96 being preferably a circular spring clip 96 with an open end that is received in an annular groove in the extension arm 46 distal end portion 43 as is well known in the art. In addition, the counterbalance weight 44 that is adjacent to the extension arm 46 distal end portion 43 is optionally movably engagable 99 along the extension arm 46 distal end portion 43, thus being operational to selectively change the distance of the counter-balance weight 44 from the roll member, to alter or maintain a selected position of the center of mass 90, thus accommodating different weight cameras 24. The amount of counterbalance weight 44 is in the range of 0.5 pounds to 2.5 pounds, with the weight possibly being more or less than the aforementioned range depending upon the camera 24 weight, dampening resistance, and selectively positioned center of mass 90 along with the magnitude or roll angle 61 and the frequency of the roll angle 61 changing in use for the self leveling camera 24 support apparatus 22 assembly. The materials of construction for the counterbalance weight 44 are preferably 303 stainless steel, or alternatively any material having the desired amount of weight and being suitable for marine applications.

Method of Use

Referring in particular to FIG. 8, and FIGS. 1–7 for the structure referred to in the self leveling camera 24 support apparatus 22 assembly, disclosed is a method of acquiring camera 24 images of an aquatic event, comprising the steps of firstly providing a self leveling camera support apparatus 22 that includes a frame 50 having a longitudinal axis 49, with the frame 50 including a first end 26 that is adapted to attach to a support structure 28 and a second end that includes a frame second end pivotal connection on the non dampener 64 side 51 and a frame second end pivotal connection on the dampener 64 side 53 that together form a pivotal connection 51 and 53 having a pivotal roll axis 30. Also provided is a roll member 52 adapted to attach to a camera 24, with the roll member 52 being pivotally attached to the pivotal connection 51 and 53, with the roll member 52 being operational to pivot about the pivotal roll axis 30. The roll member 52 also includes an extension arm 46 having a longitudinal axis 47, with the extension arm 46 including a proximal end portion 45 that is adjacent to the roll member 52. The extension arm 46 longitudinal axis 47 being positioned approximately perpendicular to the pivotal roll axis 30, with the extension arm 46 also including a distal end portion 43 that is adjacent to a counterbalance weight 44, wherein the counterbalance weight 44 is movably engagable along the distal end portion 43. The roll member 52 is operational to help maintain the camera 24 positional orientation level in relation to arbitrary pivotal roll movement 31 of the frame 50, resulting from a selectively positioned center of mass 90 of the roll member 52, camera 24, extension arm 46, and counterbalance weight 44 combined. The center of mass 90 being positioned between the pivotal roll axis 30 and the frame first end 26, wherein the frame 50 longitudinal axis 49 and the extension arm 46 longitudinal axis 47 form a parallel to angular relationship 61. The extension arm 46 proximal end portion 45 that is adjacent to the roll member 52 further comprises a fixably adjustable element 48 that allows the extension arm 46 including the extension arm 46 longitudinal axis 47 to deviate from being approximately perpendicular to the pivotal roll axis 30. The fixably adjustable element 48 is operational to accommodate a camera 24 with an offset center of gravity as previously described. Further included is an adjustable dampener 64 that is positioned adjacent to both the frame 50 and the roll member 52, the dampener 64 is operational to help control the relative arbitrary pivotal roll movement 31 of the frame 50 to the roll member 52, wherein the frame 50 longitudinal axis 49 and the extension arm 46 longitudinal axis 47 form a parallel to angular relationship.

A further step is in attaching the frame 50 first end 26 to the support structure 28, which is preferably in the form of a marine vessel railing 28 as best shown in FIG. 2. In attaching the frame 50 first end 26 to the marine vessel railing 28, the rail clamp arcuate section 56 is placed against the marine vessel railing 28 outside circumference 29 with the rail clamp pivotal element 58 retracted away from the outside circumference 29 via the rail clamp pivotal element 58 pivot 59. Then pivoting rail clamp pivotal element 58 toward the outside circumference 29 and securing the rail clamp pivotal element to the rail clamp arcuate section 56 using the rail clamp fastener 60. Note, that in FIG. 8 the self leveling camera 24 support apparatus 22 assembly is mounted on the marine vessel railing 28 with the counterbalance weight 44 facing the inside or deck side of the marine vessel 25, however, mounting the self leveling camera 24 support apparatus 22 assembly in an opposite manner in relation to the marine vessel railing 28, such that the counterbalance weight 44 would face the water surface 34 side would be acceptable also. A yet further step is in attaching the camera 24 to the roll member 52, by securing the camera 24 to the mounting pad 40 preferably by use of the mount screw 42 by hand tightening a camera 24 mount securing device 41, as is well known in the art. The positioning of the camera 24 is to fix the pan positioning and facing the camera 24 line of sight axis generally parallel to the pivotal roll axis 30 either away from or toward the counterbalance weight 44 side.

A next further step is in positioning a selected amount of the counterbalance weight 44 to accommodate the camera 24 weight, this is accomplished by selecting the counterbalance weight 44 based upon the camera 24 weight, dampening resistance, and desired center of mass 90 position along with the magnitude or roll angle 61 and the frequency of the roll angle 61 changing in use for the self leveling camera 24 support apparatus 22 assembly. Essentially, the center of mass 90 position is altered by use of the selected amount counterbalance weight 44 and/or the positioning of the counterbalance weight 44 that is movably engagable 99 along the distal end portion 43 of the extension arm 46. Thus, the position of the center of mass 90 determines the correcting or leveling force or correcting moment about the roll pivotal axis 30 to relevel the camera 24 substantially true to the horizon 32 or shoreline 36 when the support structure 28 rolls through angle 61 and frequency of the roll angle 61 changing in use. Depending upon the aquatic conditions, such as wind, water surface waves, currents, and the like along with the marine vessel orientation to the foregoing aquatic conditions, some trial and error may be done on the amount of counterbalance weight 44 and/or the positioning of the counterbalance weight 44 to achieve the desired shooting effect from the camera 24, thus acquiring trail images from the camera 24 with an initial counterbalance weight 44 and/or positioning and then repeating the process with a further selected counterbalance weight 44 and/or positioning and reacquiring further trial images from the camera 24 until the desired camera 24 images are achieved.

A final step is in acquiring the desired images from the camera 24 using the self leveling camera 24 support apparatus 22 assembly as is known in the art. Optionally, a further step after step (d) can be included wherein the further step is of adjusting the dampener 64 by adjusting the dampener resistance as previously described to further control the relative arbitrary pivotal roll movement 31 of the frame 50 to the roll member 52. Adjusting the dampener 64 dampener resistance can be accomplished a number of ways, however, preferably utilizing the orifice 84 size or internal diameter change, by either different size orifice inserts 87, as best shown in FIG. 7, or by using a different dampener housing 66 that incorporates a different size orifice 84 as best shown in FIG. 5. Alternative methods of accomplishing the dampener 64 dampener resistance adjustment could be by changing the fluid 80 properties such as viscosity, density, lubricity, and the like, by changing the size or outside diameter of the piston 76 with a corresponding change in the cylinder 78 inside diameter for a slidable engagement between the piston 76 and cylinder 78, or by changing the relation of movement between the roll member 52 movement to the piston 76 movement via a different gear ratio between the pivotal shaft drive gear 68 and the idler gear 70, as best shown in FIG. 5.

Another optional step modification is wherein the step of positioning a selected amount of said counterbalance weight 44 further includes adjusting the fixably adjustable element 48, wherein the extension arm 46 longitudinal axis 47 can be adjusted to selectably deviate from being approximately perpendicular to the pivotal roll axis 30, wherein adjustment the fixably adjustable element 48 is operational to accommodate a camera 24 with an offset center of gravity by altering the position of the center of mass 90. This is accomplished by first loosening the roll member lockable element 94 to allow the extension arm 46 proximal end portion 45 including the extension arm 46, distal end portion 43, and counterbalance weight 44 all to rotate 95 thus moving the position of the counter-balance weight 44 position 97, as best shown in FIGS. 1 and 2. The desired result is to move the position of the counterbalance weight 44 to change the center of mass 90 to accommodate the camera 24 offset center of gravity, with the result of helping to level the camera 24 true to the horizon 32. Thus, the center of mass 90 can remain substantially in line with the earth's center and being in-between the pivotal roll axis 30 and the frame 50 first end 26.

Conclusion

Accordingly, the present invention of a self leveling camera support apparatus 22 has been described with some degree of particularity directed to the embodiment(s) of the present invention. It should be appreciated, though, that the present invention is defined by the following claims construed in light of the prior art so modifications or changes may be made to the exemplary embodiment(s) of the present invention without departing from the inventive concepts contained therein.

The invention claimed is:

1. A self leveling camera support apparatus for helping isolate a camera from a rolling axis motion of a support structure, comprising:
    (a) a frame having a longitudinal axis, said frame including a first end that is adapted to attach to a support structure and a second end that forms a pivotal connection having a pivotal roll axis;
    (b) a roll member adapted to attach to the camera, said roll member is pivotally attached to said pivotal connection by a pivotal shaft, being operational to pivot about said pivotal roll axis, said roll member also includes an extension arm having a longitudinal axis, said extension arm including a proximal end portion that is adjacent to said roll member, said extension arm longitudinal axis being positioned approximately perpendicular to said pivotal roll axis, said extension arm also including a distal end portion that is adjacent to a counter balance weight, said roll member is operational to help maintain the camera positional orientation level in relation to arbitrary pivotal roll movement of said frame, resulting from a selectively positioned center of mass of said roll member, camera, extension arm, and counterbalance weight combined, said center of mass being positioned between said pivotal roll axis and said frame first end, wherein said frame longitudinal axis and said extension arm longitudinal axis form a parallel to angular relationship; and
    (c) a dampener that is positioned adjacent to both said frame and said roll member, said dampener is a piston and cylinder type utilizing a restriction orifice to control the flow of a fluid from said piston and cylinder to control a movement of said piston in relation to said cylinder, wherein said control of movement between said piston in relation to said cylinder results in a control of relative arbitrary pivotal roll movement of said frame to said roll member.

2. A self leveling camera support apparatus according to claim 1 wherein said dampener restriction orifice is variable in size, being operational to further control the movement of said piston in relation to said cylinder.

3. A self leveling camera support apparatus according to claim 1 wherein said dampener is driven by said roll member pivotal shaft that is rotatably attached to a pivotal shaft drive gear, said pivotal shaft drive gear is rotationally engaged to an idler gear, and said idler gear is rotationally engaged to a gear rack on said piston, wherein said relative arbitrary pivotal roll movement of said frame to said roll member is transmitted into said piston movement in relation to said cylinder by said pivotal shaft and drive gear, said idler gear, and said gear rack on said piston.

4. A self leveling camera support apparatus according to claim 1 wherein said frame first end that is adapted to attach to the support structure includes an arcuate section configured to substantially conform to a portion of a marine vessel rail outside circumference, a rail clamp pivotal element that is pivotally attached to said frame first end, and a rail clamp fastener, wherein said frame first end is operational to attach to a marine vessel rail.

5. A self leveling camera support apparatus according to claim 1 wherein said extension arm proximal end portion that is adjacent to said roll member further comprises a fixably adjustable element that allows said extension arm including said extension arm longitudinal axis to selectively deviate from being approximately perpendicular to said pivotal roll axis, wherein said fixably adjustable element is operational to accommodate a camera with an offset center of gravity by altering the position of said center of mass.

6. A self leveling camera support apparatus according to claim 5 wherein said fixably adjustable element includes an aperture in said roll member that rotationally receives and axially retains said extension arm proximal end portion allowing a selected rotational position of said extension arm to be locked in place with a roll member lockable element, with said extension arm proximal end portion including a fixed angle portion.

7. A self leveling camera support apparatus according to claim 1 wherein said counter balance weight that is adjacent to said extension arm distal end portion is removably engagable from said extension arm distal end portion, being operational to selectively change the amount of counterbalance weight, being operational to alter or maintain a selected position of said center of mass, thus accommodating different weight cameras.

8. A self leveling camera support apparatus according to claim 1 wherein said counter balance weight that is adjacent to said extension arm distal end portion is movably engagable along said extension arm distal end portion, being operational to selectively change the distance of said counterbalance weight from said roll member, being operational to alter or maintain a selected position of said center of mass, thus accommodating different weight cameras.

9. A self leveling camera support apparatus for helping isolate a camera from a rolling axis motion of a support structure, comprising:
   (a) a frame having a longitudinal axis, said frame including a first end that is adapted to attach to a support structure and a second end that forms a pivotal connection having a pivotal roll axis;
   (b) a roll member adapted to attach to the camera, said roll member is pivotally attached to said pivotal connection by a pivotal shaft, being operational to pivot about said pivotal roll axis, said roll member also includes an extension arm having a longitudinal axis, said extension arm including a proximal end portion that is adjacent to said roll member, said extension arm longitudinal axis being positioned approximately perpendicular to said pivotal roll axis, said extension arm also including a distal end portion that is adjacent to a counter balance weight, said roll member is operational to help maintain the camera positional orientation level in relation to arbitrary pivotal roll movement of said frame, resulting from a selectively positioned center of mass of said roll member camera, extension arm, and counterbalance weight combined, said center of mass being positioned between said pivotal roll axis and said frame first end, wherein said frame longitudinal axis and said extension arm longitudinal axis form a parallel to angular relationship; and
   (c) a dampener including a piston and a cylinder utilizing a variable size restriction orifice to control the flow of a fluid from said piston and cylinder to control a movement of said piston in relation to said cylinder, said dampener is driven by said roll member pivotal shaft that is rotatably attached to a pivotal shaft drive gear, said pivotal shaft drive gear is rotationally engaged to an idler gear, and said idler gear is rotationally engaged to a gear rack on said piston, wherein said relative arbitrary pivotal roll movement of said frame to said roll member is transmitted into said piston movement in relation to said cylinder by said pivotal shaft and drive gear, said idler gear, and said gear rack on said piston, said dampener is operational to control said relative arbitrary pivotal roll movement of said frame to said roll member resulting in a more controlled leveling action of the camera.

10. A self leveling camera support apparatus according to claim 9 wherein said frame first end that is adapted to attach to the support structure includes an arcuate section configured to substantially conform to a portion of a marine vessel rail outside circumference, a rail clamp pivotal element that is pivotally attached to said frame first end, and a rail clamp fastener, wherein said frame first end is operational to attach to a marine vessel rail.

11. A self leveling camera support apparatus according to claim 9 wherein said extension arm proximal end portion that is adjacent to said roll member further comprises a fixably adjustable element that allows said extension arm including said extension arm longitudinal axis to selectively deviate from being approximately perpendicular to said pivotal roll axis, wherein said fixably adjustable element is operational to accommodate a camera with an offset center of gravity by altering the position of said center of mass.

12. A self leveling camera support apparatus according to claim 11 wherein said fixably adjustable element includes an aperture in said roll member that rotationally receives and axially retains said extension arm proximal end portion allowing a selected rotational position of said extension arm to be locked in place with a roll member lockable element, with said extension arm proximal end portion including a fixed angle portion.

13. A self leveling camera support apparatus according to claim 9 wherein said counter balance weight that is adjacent to said extension arm distal end portion is removably engagable from said extension arm distal end portion, being operational to selectively change the amount of counterbalance weight, being operational to alter or maintain a selected position of said center of mass thus accommodating different weight cameras.

14. A self leveling camera support apparatus according to claim 9 wherein said counter balance weight that is adjacent to said extension arm distal end portion is movably engagable along said extension arm distal end portion, being operational to selectively change the distance of said counter balance weight from said roll member being operational to alter or maintain a selected position of said center of mass, thus accommodating different weight cameras.

15. A method of acquiring camera images of an aquatic event, comprising the steps of:
   (a) providing a self leveling camera support apparatus that includes a frame having a longitudinal axis, said frame including a first end that is adapted to attach to a support structure and a second end that forms a pivotal connection having a pivotal roll axis, also included is a roll member adapted to attach to a camera, said roll member is pivotally attached to said pivotal connection, being operational to pivot about said pivotal roll axis, said roll member also includes an extension arm having a longitudinal axis, said extension arm including a proximal end portion that is adjacent to said roll member, said extension arm longitudinal axis being positioned approximately perpendicular to said pivotal roll axis, said extension arm also including a distal end portion that is adjacent to a counter balance weight, said roll member is operational to help maintain the camera positional orientation level in relation to arbitrary pivotal roll movement of said frame, resulting from a selectively positioned center of mass of said roll member, camera, extension arm, and counterbalance weight combined said center of mass being positioned between said pivotal roll axis and said frame first end, wherein said frame longitudinal axis and said extension arm longitudinal axis form a parallel to angular relationship, said extension arm proximal end portion that is adjacent to said roll member further comprises a fixably adjustable element that allows said extension arm including said extension arm longitudinal axis to deviate from being approximately perpendicular to said pivotal roll axis, wherein said fixably adjustable element is operational to accommodate a camera with an offset center of gravity, further included is an adjustable dampener that is positioned adjacent to both said frame and said roll member, said dampener is a piston and cylinder type utilizing a restriction orifice to control the flow of a fluid from said piston and cylinder to control a movement of said piston in relation to said cylinder, wherein said control of movement between said piston in relation to said cylinder results in a control of relative arbitrary pivotal roll movement of said frame to said roll member, wherein said frame longitudinal axis and said extension arm longitudinal axis form a parallel to angular relationship;

(b) attaching said frame first end to a support structure;
(c) attaching said camera to said roll member;
(d) positioning a selected amount of said counterbalance weight to accommodate a camera weight;

(e) adjusting said dampener by adjusting a dampener resistance to further control the relative arbitrary pivotal roll movement of said frame to said roll member; and (f) acquiring images of the aquatic event using a camera.

16. A method of acquiring camera images of an aquatic event according to claim 15 wherein said step of positioning a selected amount of said counterbalance weight further includes adjusting said fixably adjustable element, wherein said extension arm longitudinal axis can be adjusted to selectably deviate from being approximately perpendicular to said pivotal roll axis, wherein adjustment said fixably adjustable element is operational to accommodate a camera with an offset center of gravity by altering the position of said center of mass.

* * * * *